United States Patent
Towfiq

[19]

[11] Patent Number: 5,904,318
[45] Date of Patent: May 18, 1999

[54] PASSIVE REDUCTION OF AIRCRAFT FUSELAGE NOISE

[76] Inventor: Foad Towfiq, 3399 Northwood Dr., Oceanside, Calif. 92054

[21] Appl. No.: 08/770,737

[22] Filed: Dec. 18, 1996

[51] Int. Cl.[6] .................................................. B64C 1/40
[52] U.S. Cl. ............................ 244/1 N; 244/119; 244/133
[58] Field of Search ...................... 244/119, 132, 244/133, 1 N, 118.5; 181/208, 210, 286, 290

[56] References Cited

U.S. PATENT DOCUMENTS

| | | |
|---|---|---|
| 1,972,005 | 8/1934 | Berbeck .................................. 244/119 |
| 2,095,626 | 10/1937 | Bassett et al. ....................... 244/119 X |
| 2,111,326 | 3/1938 | Norris ................................. 244/119 X |
| 2,160,066 | 5/1939 | Frische ................................ 244/119 X |
| 2,819,032 | 1/1958 | Detrie et al. . |
| 3,071,217 | 1/1963 | Gould . |
| 3,160,549 | 12/1964 | Caldwell et al. . |
| 3,472,472 | 10/1969 | Maestrello . |
| 3,698,993 | 10/1972 | Rauh . |
| 3,740,905 | 6/1973 | Adams ................................ 244/119 X |
| 3,867,244 | 2/1975 | Adams ................................ 244/119 X |
| 4,442,647 | 4/1984 | Olsen ................................. 244/119 X |
| 4,482,592 | 11/1984 | Kramer . |
| 4,635,882 | 1/1987 | SenGupta et al. . |
| 4,755,416 | 7/1988 | Schneider et al. ................... 244/1 N X |
| 5,400,296 | 3/1995 | Cushman et al. . |
| 5,472,760 | 12/1995 | Norvell .............................. 244/119 X |
| 5,712,447 | 1/1998 | Hanson .............................. 181/208 X |
| 5,714,713 | 2/1998 | Hanson .............................. 181/286 X |

*Primary Examiner*—William Grant
*Attorney, Agent, or Firm*—Donald E. Stout; D. Jennings Meincke

[57] ABSTRACT

Method and apparatus for a reinforced skin structure such as an aircraft fuselage which has reduced interior cabin noise. The reinforced skin structure according to the present invention, includes a frame assembly which has a plurality of spaced apart frame members and an outer skin mounted on the frame assembly. A plurality of inner panels, which generally defines an interior compartment, are incorporated within the skin structure. Each of the inner panels is typically supported in a spaced apart fashion from the frame members. A septum is disposed between the outer skin and at least some of the plurality of inner panels. The septum acts to provide an air barrier and increases the air resonant frequency of the cavity between the outer skin and the inner panels. A layer of insulation is placed on the inner side of the septum removing the need to place insulation against the outer skin. A damping rod is attached to at least two adjacent frame members and acts to dampen relative vibration between the frame members. A support member is provided between the damping rod and the outer skin to dampen the lateral vibration of the outer skin.

14 Claims, 2 Drawing Sheets

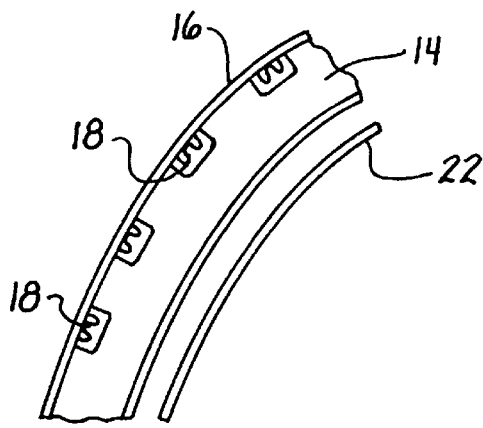
Fig. 1a
PRIOR ART
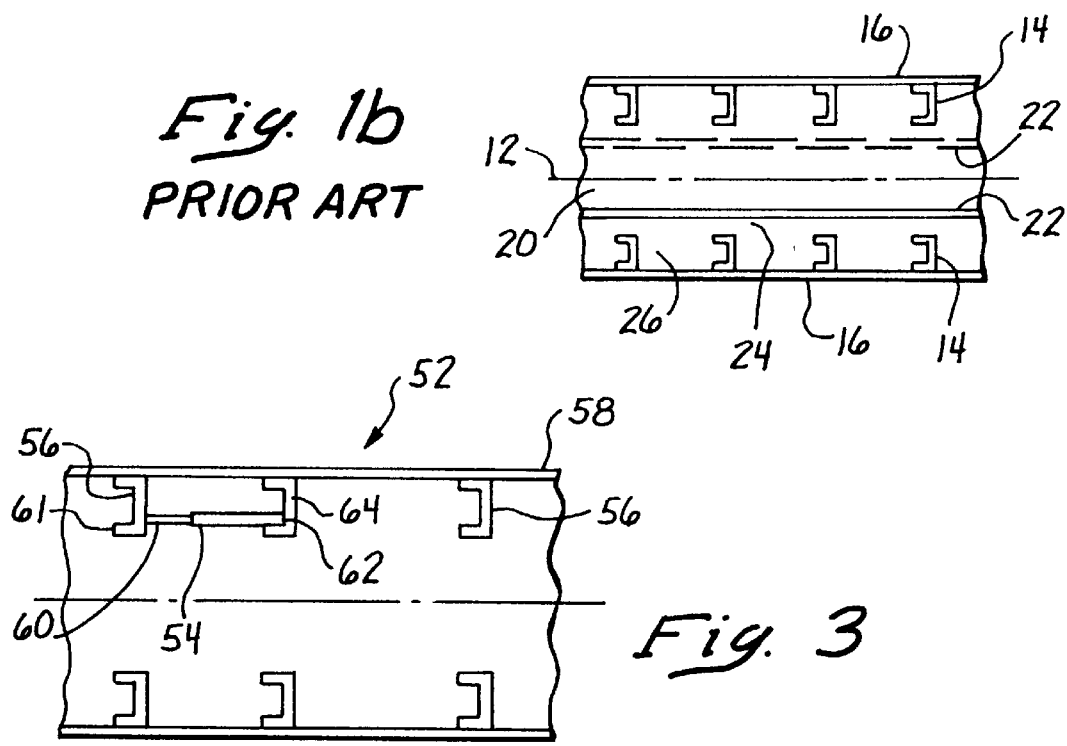
Fig. 1b
PRIOR ART
Fig. 3
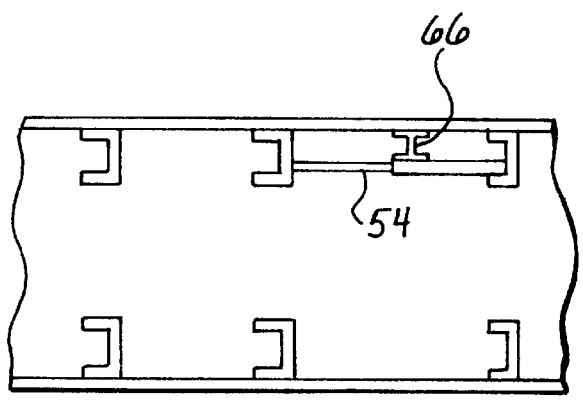
Fig. 4

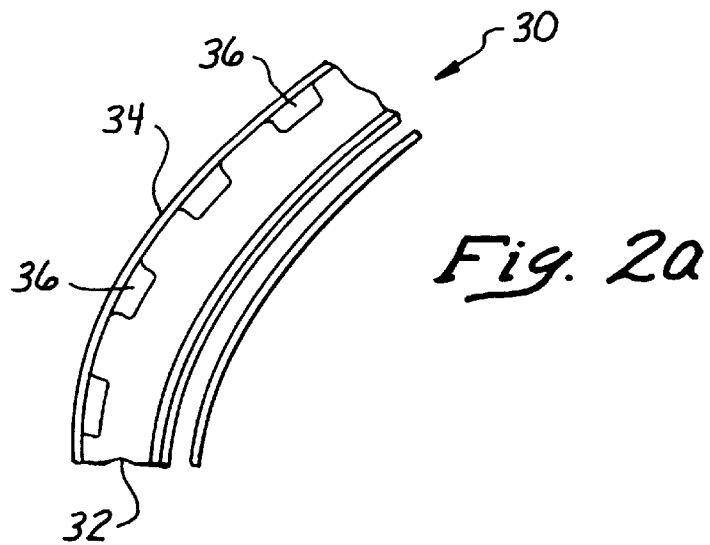
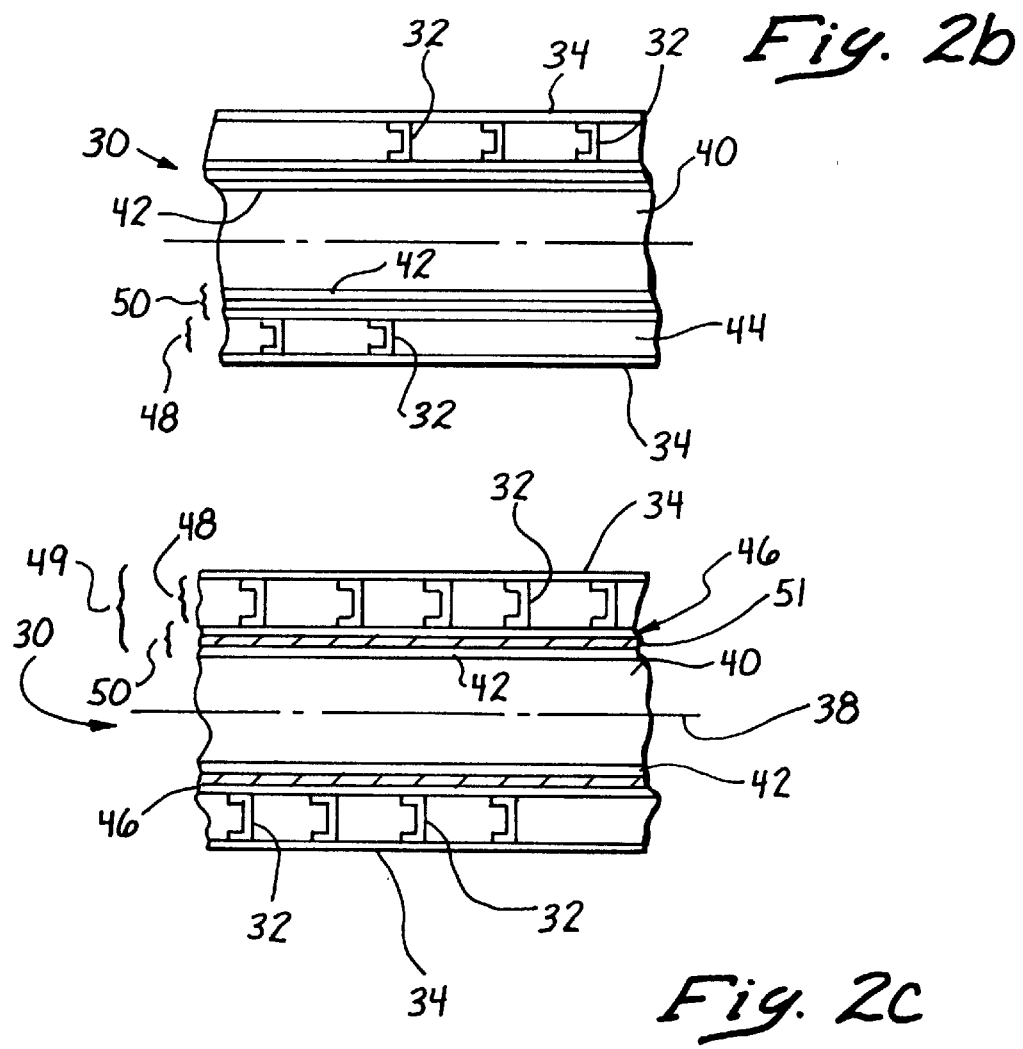

PASSIVE REDUCTION OF AIRCRAFT FUSELAGE NOISE

FIELD OF THE INVENTION

This invention relates generally to noise control, and more particularly, to a method and apparatus for passively reducing noise in the interior of an aircraft.

BACKGROUND OF THE INVENTION

In a conventional aircraft, the fuselage is generally constructed as a diaphragm structure comprising a skeleton of circumferential frames and longitudinal reinforcing members or stringers overlaid by a fuselage skin panel. The fuselage skin panel generally comprises a number of individual skin panels which are secured to the frame or stringers of the aircraft. The fuselage skin panel, among other things, provides an aerodynamic surface for the aircraft.

The conventional aircraft and particularly, the conventional aircraft designed for transporting passengers, generally includes a plurality of interior panels. These interior panels generally define the interior compartment or cabin of the aircraft and may include a trim or sidewall panel, a ceiling panel and a floor panel. The panels are typically supported by the frame of the aircraft. However, effort is made to decouple these interior panels from the frame assembly by spacing them apart from the fuselage frame assembly and by limiting the number of supports. This reduces the transfer of vibration from the aircraft frame assembly into the interior panels.

As the aircraft travels through the atmosphere, air turbulence is generated around the fuselage skin panels. This air turbulence acts on the skin panels setting them into several modes of vibration, including a significant lateral shear wave. These modes of vibration generally include a number of particular frequencies that take on a modal response of nodes and anti-nodes across the surface of the skin panels.

A vibrating skin panel can often act as an efficient loud speaker, radiating noise into the interior panels and into the cabin of the aircraft. Energy from the vibrating skin panels can also be transferred into the aircraft frame assembly supporting the skin panels and subsequently to the interior panels of the aircraft, also setting them into vibration. The vibrating interior panels can also act as loud speakers, generating sound which is directly transmitted into the cabin of the aircraft.

In addition to the modal frequencies incident in the fuselage due to air turbulence, there are a number of other frequencies in which the skin panels and the frame assembly are forced to vibrate. These frequencies include engine tone frequencies and air resonance frequencies. The engine tone frequencies are particular frequencies of vibration generated by the aircraft engines. These vibrations are transferred through the fuselage structure to the fuselage panels and into the interior panels of the aircraft.

Air resonance frequencies are particular frequencies of air resonance (or standing waves) formed when air resonates in the cavity between the fuselage skin panel and the spaced apart interior panels. Air resonance may also be formed between adjacent frame members within the cavity between the skin panels and the interior panels.

The circumferential frame members are generally spaced apart along the longitudinal axis of the aircraft. The ribs or members of this frame structure provides a periodic cavity between each frame member suitable for formation of standing waves at certain frequencies. The standing waves formed between adjacent frame members causes lateral vibration of the frame members parallel to the longitudinal axis of the aircraft. In addition, the frame members are coupled together through the stringers and the skin panels. Therefore, resonant vibration set up between two frame members due to airborne noise can easily be transferred to adjacent frame members and endure longer, as in tuning forks. This lateral vibration of the circumferential frame members enhances the out-of-plane vibration (perpendicular to the longitudinal axis of the aircraft) of the fuselage skin panels and increases the sound radiated into the interior panel and cabin.

A common prior art solution for attenuating the transmission of noise into the cabin of an aircraft utilizes insulation blankets. These insulation blankets generally incorporate both thermal and acoustic insulation and are placed into the air space or cavity between the fuselage skin panels and the interior panels. Although somewhat effective in attenuating higher frequency noise, insulation blankets are relatively ineffective at attenuating low frequency noise. This lower frequency noise tends to transmit the majority of noise into the aircraft cabin.

In addition to not significantly attenuating low frequency noise, prior art insulation blankets have other shortcomings. For example, these fuselage insulation blankets often become wet and retain moisture during normal flight operation as a result of condensation on the aircraft fuselage skin panels. In addition to increasing the overall weight of the aircraft, these wet insulation blankets increase the corrosion of the aircraft. Additionally, airlines have experienced passenger and service door malfunctions due to frozen insulation blankets in the door.

Another common prior art solution for attenuating the transmission of noise into the cabin of an aircraft utilizes passive damping devices such as a viscoelastic panels or skin panels having an increased density towards the frame members. These panels are attached to the fuselage and act to dampen the incident vibration. However, these devices are only effective at dampening at particular frequencies. In addition, these devices do little to attenuate sound radiated into the interior cabin of the aircraft due to the air resonance previously discussed. These passive devices can also add considerable weight to the aircraft.

A need has existed in the prior art for a conventional aircraft or other reinforced skin structure which provides improved noise attenuation within the fuselage. There is also a need for such an aircraft or other reinforced skin structure which effectively attenuates noise transmitted into the interior of the craft due to air resonance in the cavity between the fuselage or outer skin panels as well as noise transmitted into the aircraft due to air resonance and vibration in the cavities between the outer skin panels and adjacent frame members. There is also a need for such an aircraft or other reinforced skin structure which has improved thermal and acoustic insulation which prevents the capture and retention of condensation. There is also a need for a method and apparatus of attenuating noise transmitting into the interior of an existing conventional aircraft which is lightweight, non-toxic, inexpensive and simple to install.

SUMMARY

The present invention provides a reinforced skin structure having features of the present invention which is effective at attenuating noise directly transmitted into the structure by the vibrating frame and attached outer skin panels. The reinforced skin structure and method of the present invention is also effective at attenuating noise within the interior of the structure or any other conventional aircraft caused by air resonance between the outer skin panels and the interior panels as well as between the outer skin panels and two adjacent frame members. The reinforced skin structure and method of the present invention also provides effective noise attenuation while enhancing thermal insulation within the interior of the aircraft or other reinforced skin structure without having the moisture retention and corrosion problems of the prior art.

The passive damping method and apparatus of the present invention provides a simple and effective way of attenuating noise in the interior of a conventional aircraft or other reinforced skin structure. The present invention provides an apparatus which may be incorporated into an existing aircraft or other reinforced skin structure or alternatively may be provided as part of the original aircraft. The present invention provides an apparatus that is lightweight, non-toxic, inexpensive and effective at attenuating noise in the interior of the aircraft or other reinforced skin structure and that is also simple and inexpensive to install.

A reinforced skin structure, according to the present invention, includes a frame assembly which has a plurality of spaced apart frame members and an outer skin mounted on the frame assembly. A plurality of inner panels, which generally defines an interior compartment, are incorporated within the skin structure. Each of the inner panels is typically supported by the frame members. However, the inner panels are spaced apart from the plurality of frame members in an attempt to de-couple the inner panels from the vibrating frame assembly. A septum is disposed between the outer skin and at least some of the plurality of inner panels. The septum is attached to at least some of the plurality of frame members so that the septum is spaced apart from the outer skin as well as from the plurality of inner panels. Thus, the septum generally surrounds a portion of the interior compartments without contacting either the inner panels or the outer skin.

Broadly, the frame assembly, which may be a conventional aircraft frame assembly, includes a plurality of coaxial frame members or ribs. Each of these frame members or ribs is spaced apart from each other along a longitudinal axis of the skin structure. The frame assembly also includes a plurality of spaced apart reinforcing members or stringers which are generally perpendicular to the frame members. The stringers are used to interconnect each of the frame members and for supporting the outer skin.

In general, the septum comprises a separating layer between the outer skin and at least some of the inner panels. This separating layer acts as an air barrier and reduces the air resonance in each of the cavities formed between the outer skin, the inner panels and adjacent frame members. Reducing this air resonance reduces the noise in the interior cabin. A layer of insulation is attached to the septum in the space or cavity between the septum and at least some of the inner panels. This insulation provides a lightweight fire and moisture resistant material and removes the existing need to have the insulation against the outer skin or in the case of a conventional aircraft, against the outer fuselage wall.

According to another broad aspect of the present invention, a reinforced skin structure for use as a conventional aircraft fuselage assembly includes a plurality of spaced apart frame members which extend generally laterally about a longitudinal axis of the fuselage assembly and a fuselage skin. The fuselage skin is separated by the plurality of frame members. A damping rod is connected between at least two of the frame members. The damping rod has a first end which is attached to a first frame member and a distal second end which is attached to a second frame member. The first end of the damping rod is movable relative to the second distal end and this movement acts to dampen the bending, torsional and tuning fork vibration of the attached frame members. The damping rod is generally connected perpendicular to the frame members.

According to yet another aspect of the present invention, the conventional aircraft fuselage assembly further includes a second damping rod. This second damping rod is mounted between the fuselage skin and the first damping rod. In this way the second damping rod acts to dampen vibrations in the fuselage skin between the attached frame members as well as in the adjacent outer skin panel.

According to yet another aspect of the present invention, a method of reducing noise in an interior compartment of a reinforced skin structure is provided. The method generally applies to any reinforced skin structure such as an aircraft fuselage, which is formed of an outer skin supported by a plurality of spaced apart frame members and includes a plurality of inner panels which define the interior compartment. The plurality of inner panels are generally spaced apart from the plurality of frame members. This spacing defines a first cavity.

The method includes attaching a septum or separating layer to at least some of the frame members. The septum is placed between the outer skin and at least some of the plurality of inner panels generally dividing the first cavity into a second cavity located between the outer skin and the septum, and a third cavity located between the septum and the plurality of inner panels. The septum acts as an air barrier, effectively reducing the lateral length of the first cavity and thus increasing the air resonance frequency of the two smaller resulting cavities. By increasing the air resonance frequency of the cavities, less noise energy is transferred into the interior compartments of the aircraft. Additionally, the septum acts to dampen some of the vibrational energy transferred from the second cavity into the third cavity and thus attenuates noise. An insulating layer may also be applied to the septum between the septum and plurality of inner panels.

According to yet another aspect of the present invention, the method for reducing noise in the interior compartment of a reinforced skin structure further includes mounting a damping rod between a first frame member and a second frame member. The damping rod is then tuned to damp at the resonant frequency of the first and second frame members to which the damping rod is attached.

BRIEF DESCRIPTION OF THE DRAWINGS

FIG. 1a is a simplified cross-sectional view of a typical aircraft showing a portion of the fuselage structure;

FIG. 1b is a simplified sectional view taken along the longitudinal axis of the aircraft of FIG. 1a also showing a portion of the fuselage structure;

FIG. 2a is a simplified partial cross-sectional view showing a typical reinforced skin structure having the features of the present invention;

FIG. 2b is a simplified partial sectional view taken along the longitudinal axis of the reinforced skin structure as depicted in FIG. 2a;

FIG. 2c is a simplified partial sectional view of the reinforced skin structure as depicted in FIG. 2b shown incorporating an embodiment of a septum and an insulation layer according the principles of the present invention;

FIG. 3 is a simplified view of the portion of the fuselage structure as depicted in FIG. 1b shown incorporating an embodiment of a damping rod according to the principles of the present invention; and FIG. 4 is a simplified view of the portion of the fuselage structure as depicted in FIG. 3 shown incorporating an embodiment of a center damping rod having the features of the present invention.

DETAILED DESCRIPTION OF THE DRAWINGS

FIGS. 1a and 1b are simplified sectional views of a portion of a reinforced skin structure 10, specifically, a portion of the fuselage structure 10 of an aircraft is shown. In particular, FIG. 1a is a simplified cross-sectional view of a portion of the fuselage structure 10 of a conventional aircraft and FIG. 1b is a simplified sectional view taken along a longitudinal axis 12 of the same aircraft. The fuselage structure 10 includes a portion of a frame member 14, a portion of the outer skin 16 and a series of reinforcing elements or stringers 18. In a conventional manner, the frame member 14 is generally circular or otherwise shaped according to the cross section of the structure or aircraft and supports a series of the reinforcing elements 18 at spaced apart locations. The reinforcing elements 18 may be attached to the frame member 14 using conventional attachment devices or methods. The outer skin 16 which may comprise a plurality of individual skin panels 16, is attached to the reinforcing elements 18 using conventional methods and devices.

Referring now to FIG. 1b, a simplified sectional view taken along the longitudinal axis 12 of a conventional aircraft shows the fuselage structure 10 and an interior compartment 20. This interior compartment 20 is generally defined by a plurality of inner panels 22 which are fitted together to form the interior compartment or cabin 20. Each of the inner panels 22 is typically spaced apart and de-coupled from the frame members 14 so that vibration cannot be directly transferred from the vibrating frame members 14 into the inner panels 22. However, practicality generally requires that the inner panels 22 be minimally connected to the frame members 14 in some fashion to provide support for the interior compartment 20. To maximize the diameter or otherwise size of the interior compartment 20, the inner panels 22 are placed as close to the frame members 14 as possible. Typically the spacing between the frame members 14 and the inner panels 22 may be in the order of one inch.

Because the inner panels 22 of the interior compartment 20 are generally spaced apart from the frame members 14, the direct transfer of structural vibration from the outer skin 16 and the frame members 14 is minimized. However some direct structural vibration is induced in the inner panels 22 which is then transmitted as noise into the interior compartment 20. In addition to this structural vibration, airborne noise generated by vibration of the outer skin 16 and the frame members 14 is transmitted into the inner panels 22 through the spacing 24 between the outer skin 16 and the inner panels 22. This airborne noise is transmitted by the inner panels 22 into the interior compartment 20. Insulation blankets may provide some attenuation of this airborne noise, however, these methods have proved inadequate as discussed supra. Additional noise is passed into the interior compartment 20 due to the air resonance within the spacing or cavity 24 defined between the inner panels 22, the outer skin 16 and each pair of adjacent frame members 14. Noise may also be generated by air resonance in the cavity 26 defined between each of the frame members 14.

Referring now to FIGS. 2a and 2b, an embodiment of a reinforced skin structure 30 having features of the present invention is shown. The reinforced skin structure 30, which may be a fuselage structure as depicted in FIGS. 1a and 1b, includes a portion of a frame member 32, a portion of an exterior or outer skin 34 and a series of reinforcing elements or stringers 36. As previously described, the frame member 32 may be generally circular and support the reinforcing elements 36 which in turn support the exterior skin 34. The reinforcing elements 36 may be attached to the frame member 32 by conventional attachment devices or methods. The outer skin 34 which generally comprises a plurality of individual outer skin panels 34 may be attached to the reinforcing elements 36 using conventional methods or devices.

An interior compartment or cabin 40 is defined within the reinforced skin structure 30 by a plurality of inner panels 42. As previously discussed, the inner panels 42 are generally spaced apart from the frame members 32 to prevent the direct transfer of vibration. This spacing defines a first cavity 44 between the outer skin panel 34 and the inner panels 42. The interior compartment 40 may be provided throughout the interior of the reinforced skin structure 30 or merely throughout a portion.

A septum 46 is attached to at least some of the frame members 32. The septum 46 may be attached directly to each of the frame members 32 or alternatively may be attached in any manner which generally retains the septum 46 against at least some of the frame members 32. In particular, the septum 46 may be riveted to the frame members however, adhesive, screws or any other mechanical fastening devices may also be used. The septum 46 provides an air barrier between the outer skin 34 and the inner panels 42. In this way, the first cavity 44 is divided into a second cavity 48 between the out skin 34 and the septum 46, and a third cavity 50 between the septum 46 and the inner panels 42.

As an air barrier, the septum 46 modifies the frequency of the air resonance in the first cavity 44. Specifically, the septum 46 creates an air barrier or wall which reduces the lateral distance between the outer skin 34 and the inner panels 42 by creating two cavities 48 and 50 where there was originally a single cavity 44. By creating two cavities 48 and 50, each having a shorter air resonance length (distance between the walls) than the first cavity 44, the resonance frequency of the higher. This increase in the resonant frequency of the second and third cavities 48 and 50 reduces the resonant noise generated and thus reduces the noise transferred into the interior compartment 40. The septum 46 also provides an air barrier which dampens the air set into motion by the vibrating outer skin 34 and frame members 32. This damping also reduces the transmitted vibration into the interior panels 42 and thus reduces noise transmitted into the interior compartment 40.

Broadly speaking, air resonance in a cavity may be approximated by the equation:

$$\text{frequency} = \frac{6600}{L}$$

where L is the cavity resonance length in inches. This equation shows that as the cavity resonance length is reduced, the resonant frequency of the cavity is increased. For example, an MD-11® aircraft, manufactured by McDonnell Douglas Corporation of Long Beach, Calif., has a spacing of approximately 5.25 inches between the inside of the outer skin 34 and the inner panels 42. This spacing yields a first cavity 44 having a frequency of approximately 1,250 hertz. If a septum 46 is introduced between the outer skin 34 and the inner panels 42 by attaching it to the frame members 32, the first cavity 44 will have a length of approximately 4 inches. Thus, the second cavity 48 will have an air resonant frequency of approximately 1,650 hertz and the third cavity an air resonant frequency of approximately 5,300 hertz. By increasing the frequency of the air resonance in each cavity, the amount of noise generated is reduced. In addition to increasing the frequency and reducing the noise transferred into the interior compartment 40, the septum 46 acts to dampen some of the airborne noise being transmitted into the interior panels 42 by the vibrating outer skin 34 and frame members 32.

The septum 46 generally comprises a sheet or layer of material which acts as an air barrier dividing the first cavity 44 between the outer skin 34 and the inner panels 42 into the second cavity 48 and third cavity 50. The septum may comprise a layer of fiberglass reinforced fabric or material, a layer of thermoplastic or other plastic material, or a layer of any material which is capable of creating an air barrier as described. In a preferred embodiment, the septum comprises lightweight fire and moisture resistant material which is highly durable. In this way, the aircraft or reinforced skin structure 30 may enjoy the noise reduction benefits of the septum 46 without having to carry substantial additional weight. In addition, in conventional aircraft, fire is a major concern. By providing a septum which is fire resistant, additional fire protection may be provided. The thickness of the septum 46 should be sufficient to provide durability and any other noise suppression or fire resistant qualities desired during the life of the reinforced skin structure 30.

A layer of insulation 51 may be provided adjacent to septum 46. In this embodiment, the layer of insulation 51 may be attached to the septum 46 or alternatively to the interior panels 42 using any conventional means such as adhesive or mechanical fasteners. The layer of insulation 51 is preferably a lightweight fire and moisture-resistant material for providing both thermal and acoustic insulation for the interior compartment 40. In a preferred embodiment, the insulation may be a heat stabilized, oxidized, polyacrylonitrile fiber such as ORCOBLOK which is manufactured by Orcon Corporation, Union City, Calif. However, any insulation that is lightweight and moisture resistant may be used.

By providing a layer or multiple layers of insulation 51 in the third cavity 50 between the inner panels 42 and the septum 46, the use of conventional insulation is no longer necessary. This eliminates the need for placing the conventional insulations against the inside of the outer skin 34. By eliminating this conventional insulation in the second cavity 48 between the outer skin 34 and the septum 46, condensation may be more readily removed since no insulation blanket remains to retain this moisture or condensation. The septum 46 acts as an air barrier preventing the moist air from within the second cavity 48 from reaching the layer of insulation 51 in the third cavity 50. Thus, the problems in conventional aircraft of having the insulation adjacent the fuselage skin panels is eliminated. Additionally, a substantial weight savings may be achieved by eliminating the previously retained condensation.

Referring now to FIG. 3, a simplified partial sectional view of a reinforced skin structure 52 is shown incorporating an embodiment of a damping rod 54 according to the principles of the present invention. The reinforced skin structure 52 may generally be constructed in accordance with the principles of a conventional aircraft fuselage and includes a plurality of circumferential frame members 56. The frame members 56 support a plurality of spaced apart reinforcing members (not shown) which in turn support the outer fuselage skin 58. The damping rod 54 may have a first end 60 which is attached to a first frame member 61 and a second end 62 which is attached to a second frame member 64. The first frame member 61 and the second frame member 64 are preferably adjacent circumferential frame members, however the damping rod 54 may span across other of the plurality of frame members 56. A plurality of damping rods 54 may be used to dampen a number of adjacent frame members 56.

The damping rod 54 generally acts to reduce vibration in each of the first and second frame members 61 and 64. This vibration may be due to structural vibration or due to air resonance in the cavity defined between the first and second frame members 61 and 64 as well as by the outer skin 58. The damping rod 54 may dampen the bending, torsional and tuning fork vibrations in each of the attached first and second frame members 61 and 64. The damping rod 54 generally includes a first end 60 which is movable relative to the second end 62. However, this movement is dampened. This dampening action may be achieved by using a viscoelastic member, a spring, hydraulics, pneumatics, or any other method or device for damping relative movement. The damping rod 54 may be tuned to dampen at a particular frequency depending on the method of damping use. Tuning may be achieved using techniques known to those of skill in the art.

The damping rod 54 may be tuned such that it dampens vibration at the natural air resonant frequency of the cavity defined between the first and second frame members 61 and 64 and the outer skin 52. If inner panels or a septum is provided, these will further define the cavity. However, the damping rod 54 is designed to work in an open fuselage or reinforced skin structure 52 as well as with a reinforced skin structure having an interior compartment. In this way, vibrations induced by the air resonance can be minimized. The damping rod 54 may alternatively be tuned to dampen at a resonant frequency of the first and second frame members 61 and 64.

Referring now to FIG. 4, the reinforced skin structure 52 of FIG. 3 is shown incorporating the damping rod 54 and a support member 66 of the present invention. In this embodiment, the support member may be a fixed support between the outer skin 58 and the damping rod 54 to reduce vibrations in the outer skin panel 58. Alternatively, the support member 66 may also be a damping device such as a solid viscoelastic material so as to absorb energy from the vibrating outer skin 58. In another alternative embodiment, the support member 66 may be a second damping rod. This second damping rod may also be tuned to dampen at certain specific vibrational frequencies in the outer skin 58. The support member 66 may be attached to the outer skin 58 through an adhesive, a mechanical fastening device, or any method of retaining the support member 66 against the outer skin 58. On the opposing end, the support member 66 may be attached to the damping rod 54 through use of an adhesive or preferably a mechanical fastener or attachment device or alternatively through welding.

Referring now back to FIG. 2c, in conjunction with FIG. 4, an alternative embodiment of the present invention will be described. In this embodiment, the reinforced skin structure 30 may include the septum 46 of the present invention in addition to the damping rod 54 and support member 66 previously described. In this embodiment, maximum reduction of both the cavity air resonance noise and structural vibration may be achieved. However, various combinations of the septum 46 and the damping rod 54 as well as the support member 66 may be used.

While this invention has been described with respect to various specific examples and embodiments, it is to be understood that the invention is not limited thereto and that it can be variously practiced within the scope of the following claims.

What is claimed is:

1. A reinforced skin structure comprising:
   a frame assembly having a plurality of spaced apart frame members;
   an outer skin mounted on said frame assembly;
   a plurality of inner panels generally defining an interior compartment within said skin structure, each of said inner panels being generally spaced apart from said plurality of frame members to thereby create a first cavity;
   a septum comprising a layer of fiberglass-reinforced plastic disposed in said first cavity between said outer skin and at least some of said plurality of inner panels, said septum being attached to at least some of said plurality of frame members such that said septum is spaced apart from said outer skin and said plurality of inner panels, thereby forming second and third cavities, said second cavity being defined by said outer skin and said septum and said third cavity being defined by said septum and said plurality of inner panels, whereby said septum is capable of acting as an air barrier resulting in reduced air resonance in said first cavity, said septum being flexible such that said septum is capable of dampening some of the vibrational energy transferred from said second cavity into said third cavity;
   wherein material capable of absorbing a significant amount of condensation is not in contact with an inner surface of said outer skin and
   there is neither mechanically resilient nor mechanically absorbing means connecting said outer skin to said septum.

2. A method of reducing noise in an interior compartment of a reinforced skin structure formed of an outer skin supported by a plurality of spaced apart frame members, said reinforced skin structure having a plurality of inner panels generally defining said interior compartment, each of said plurality of inner panels being spaced apart from said plurality of frame members defining a first cavity, said method comprising the steps of:
   reducing noise entering said interior compartment by air resonance by attaching a septum comprised of a layer of fiberglass reinforced fabric to said frame members between said outer skin and at least some of said plurality of inner panels to generally define a second cavity between said outer skin and said septum and a third cavity between said septum and said plurality of inner panels, wherein there is neither mechanically resilient nor mechanically absorbing means connecting said outer skin to said septum;
   ensuring that a significant amount of condensation from an interior surface of said outer skin is not absorbed by removing any insulation from said second cavity and not placing insulation in said second cavity; and
   reducing noise entering said interior compartment as a result of vibrational energy by providing said septum with the property of being flexible such that said septum is capable of dampening some of the vibrational energy transferred from said second cavity into said third cavity.

3. A reinforced skin structure comprising:
   a frame assembly having a plurality of spaced apart frame members;
   an outer skin mounted on said frame assembly;
   a plurality of inner panels generally defining an interior compartment within said skin structure, each of said inner panels being generally spaced apart from said plurality of frame members to thereby create a first cavity;
   a septum comprising a layer of thermoplastic material disposed in said first cavity between said outer skin and at least some of said plurality of inner panels, said septum being attached to at least some of said plurality of frame members such that said septum is spaced apart from said outer skin and said plurality of inner panels, thereby forming second and third cavities, said second cavity being defined by said outer skin and said septum and said third cavity being defined by said septum and said plurality of inner panels, whereby said septum is capable of acting as an air barrier resulting in reduced air resonance in said first cavity, said septum being flexible such that said septum is capable of dampening some of the vibrational energy transferred from said second cavity into said third cavity;
   wherein material capable of absorbing a significant amount of condensation is not in contact with an inner surface of said outer skin and
   there is neither mechanically resilient nor mechanically absorbing means connecting said outer skin to said septum.

4. A reinforced skin structure comprising:
   a frame assembly having a plurality of spaced apart frame members;
   an outer skin mounted on said frame assembly;
   a plurality of inner panels generally defining an interior compartment within said skin structure, each of said inner panels being generally spaced apart from said plurality of frame members to thereby create a first cavity;
   a septum disposed in said first cavity between said outer skin and at least some of said plurality of inner panels, said septum being attached to at least some of said plurality of frame members such that said septum is spaced apart from said outer skin and said plurality of inner panels, thereby forming second and third cavities, said second cavity being defined by said outer skin and said septum and said third cavity being defined by said septum and said plurality of inner panels, whereby said septum is capable of acting as an air barrier resulting in reduced air resonance in said first cavity, said septum being flexible such that said septum is capable of dampening some of the vibrational energy transferred from said second cavity into said third cavity; and
   a layer of insulation attached to said septum between said septum and at least some of said inner panels;
   wherein material capable of absorbing a significant amount of condensation is not in contact with an inner surface of said outer skin and
   there is neither mechanically resilient nor mechanically absorbing means connecting said outer skin to said septum.

5. A reinforced skin structure as recited in claim 4 wherein said insulation comprises a lightweight, fire and moisture resistant material.

6. A reinforced skin structure as recited in claim 5 wherein said material comprises a heat stabilized, oxidized polyacrylonitrile fiber.

7. A reinforced skin structure comprising:

a frame assembly having a plurality of spaced apart frame members;

an outer skin mounted on said frame assembly;

a plurality of inner panels generally defining an interior compartment within said skin structure, each of said inner panels being generally spaced apart from said plurality of frame members to thereby create a first cavity;

a septum disposed in said first cavity between said outer skin and at least some of said plurality of inner panels, said septum being attached to at least some of said plurality of frame members such that said septum is spaced apart from said outer skin and said plurality of inner panels, thereby forming second and third cavities, said second cavity being defined by said outer skin and said septum and said third cavity being defined by said septum and said plurality of inner panels, whereby said septum is capable of acting as an air barrier resulting in reduced air resonance in said first cavity, said septum being flexible such that said septum is capable of dampening some of the vibrational energy transferred from said second cavity into said third cavity;

a layer of insulation disposed in said third cavity;

wherein material capable of absorbing a significant amount of condensation is not in contact with an inner surface of said outer skin and there is neither mechanically resilient nor mechanically absorbing means connecting said outer skin to said septum.

8. A reinforced skin structure as recited in claim 7 wherein said insulation comprises a lightweight, fire and moisture resistant material.

9. A reinforced skin structure as recited in claim 8 wherein said material comprises a heat stabilized, oxidized polyacrylonitrile fiber.

10. A method of reducing noise in an interior compartment of a reinforced skin structure formed of an outer skin supported by a plurality of spaced apart frame members, said reinforced skin structure having a plurality of inner panels generally defining said interior compartment, each of said plurality of inner panels being spaced apart from said plurality of frame members defining a first cavity, said method comprising the steps of:

reducing noise entering said interior compartment by air resonance by attaching a septum comprising a layer of thermoplastic material to said frame members between said outer skin and at least some of said plurality of inner panels to generally define a second cavity between said outer skin and said septum and a third cavity between said septum and said plurality of inner panels, wherein there is neither mechanically resilient nor mechanically absorbing means connecting said outer skin to said septum;

ensuring that a significant amount of condensation from an interior surface of said outer skin is not absorbed by removing any insulation from said second cavity and not placing insulation in said second cavity; and reducing noise entering said interior compartment as a result of vibrational energy by providing said septum with the property of being flexible such that said septum is capable of dampening some of the vibrational energy transferred from said second cavity into said third cavity.

11. A method of reducing noise in an interior compartment of a reinforced skin structure formed of an outer skin supported by a plurality of spaced apart frame members, said reinforced skin structure having a plurality of inner panels generally defining said interior compartment, each of said plurality of inner panels being spaced apart from said plurality of frame members defining a first cavity, said method comprising the steps of:

reducing noise entering said interior compartment by air resonance by attaching a septum to said frame members between said outer skin and at least some of said plurality of inner panels to generally define a second cavity between said outer skin and said septum and a third cavity between said septum and said plurality of inner panels, wherein there is neither mechanically resilient nor mechanically absorbing means connecting said outer skin to said septum;

ensuring that a significant amount of condensation from an interior surface of said outer skin is not absorbed by removing any insulation from said second cavity and not placing insulation in said second cavity;

reducing noise entering said interior compartment as a result of vibrational energy by providing said septum with the property of being flexible such that said septum is capable of dampening some of the vibrational energy transferred from said second cavity into said third cavity; and increasing fire protection by applying an insulating layer to at least a portion of said septum between said septum and said plurality of inner panels, wherein said insulating layer comprises a lightweight, fire and moisture resistant material.

12. The method as recited in claim 11, wherein said material comprises a heat stabilized, oxidized polyacrylonitrile fiber.

13. A method of reducing noise in an interior compartment of a reinforced skin structure formed of an outer skin supported by a plurality of spaced apart frame members, said reinforced skin structure having a plurality of inner panels generally defining said interior compartment, each of said plurality of inner panels being spaced apart from said plurality of frame members defining a first cavity, said method comprising the steps of:

reducing noise entering said interior compartment by air resonance by attaching a septum to said frame members between said outer skin and at least some of said plurality of inner panels to generally define a second cavity between said outer skin and said septum and a third cavity between said septum and said plurality of inner panels, wherein there is neither mechanically resilient nor mechanically absorbing means connecting said outer skin to said septum;

ensuring that a significant amount of condensation from an interior surface of said outer skin is not absorbed by removing any insulation from said second cavity and not placing insulation in said second cavity;

reducing noise entering said interior compartment as a result of vibrational energy by providing said septum with the property of being flexible such that said septum is capable of dampening some of the vibrational energy transferred from said second cavity into said third cavity; and increasing fire protection by disposing insulation in said third cavity, wherein said insulation comprises lightweight, fire and moisture resistant material and said third cavity is not packed with said insulation such that the effectiveness of said septum to dampen vibrational energy is substantially reduced.

14. The method as recited in claim 13, wherein said material comprises a heat stabilized, oxidized polyacrylonitrile fiber.

* * * * *